United States Patent
Otranen (10) Patent No.: US 7,471,200 B2
(45) Date of Patent: Dec. 30, 2008

(54) RFID OPTIMIZED CAPABILITY NEGOTIATION

(75) Inventor: Jari Otranen, Espoo (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 11/174,289

(22) Filed: Jun. 30, 2005

(65) Prior Publication Data

US 2007/0001853 A1    Jan. 4, 2007

(51) Int. Cl.
*G08B 13/14* (2006.01)
(52) U.S. Cl. ............ 340/572.1; 340/505; 709/224
(58) Field of Classification Search ... 340/572.1–572.9, 340/10.1, 505; 709/209, 224
See application file for complete search history.

(56) References Cited

U.S. PATENT DOCUMENTS

2004/0054776 A1 * 3/2004 Klotz et al. ............... 709/224

2005/0077356 A1 * 4/2005 Takayama et al. ............ 235/451

FOREIGN PATENT DOCUMENTS

EP    1633104    3/2006

OTHER PUBLICATIONS

Patent Abstract of Japan, Publication No. 2004-364145, "System, Equipment and Method for Communication, and Program," published Dec. 24, 2004.
"Near Field Communication," White paper, ECMA International (internet document) http://www.ecma-international.org/activities/Communitications/2004tg19-001.pdf, pp. 1-72.

* cited by examiner

*Primary Examiner*—Phung T Nguyen (57) ABSTRACT

A near field communication (NFC) device is capable of operating as an NFC initiator device or an NFC target device for exchanging request and response messages with another similar device in order to determine a secondary transport mechanism suitable for communications between the two devices with bandwidth greater than available for NFC and for determining appropriate roles for both devices without excessive communication. Such determination of roles can be determined by rule or by exchanging information indicating a choice of roles.

56 Claims, 7 Drawing Sheets

RFID OPTIMIZED CAPABILITY NEGOTIATION

BACKGROUND OF THE INVENTION

1. Technical Field

The present invention relates Near Field Communication (NFC) Radio Frequency Identification (RFID) technology and, more particularly, to providing contact-less data transfer capabilities between two data-carrying devices, a reader (Initiator) and a receiver (Target).

2. Discussion of Related Art

For background information on the present invention the reader is referred to a white paper entitled "Near Field Communication" published by ECMA International under document number ECMA/TC32-TG19/2004/1. That document shows near field communication equipped devices brought into close proximity in order to exchange parameters necessary for setting up a communication with more bandwidth using a secondary communication technology, other than NFC, such as Wireless LAN (WLAN) or Bluetooth® communication. An NFC reader device initializes data transfer and issues a data exchange request to an NFC Target device. The target device can be a powerless memory card or an intelligent RFID device capable of data processing itself. Memory card based solutions are traditionally used in ticketing application while an emerging standard for RFID device to RFID-device communication has been specified by ECMA-340 (see also ISO/IEC 18092 (2004) and ETSI EN 302 190 v1.1.1 (2005-02)). These documents are all quite similar and are all titled "Near Field Communication Interface Protocol (NFCIP-1)" and define a half-duplex data exchange protocol between two devices. Some companies have decided to use NFCIP as an RFID protocol to be supported in their portable devices, such as mobile terminals. However, the concept can be enlarged to embrace non-portable devices as well. In other words, a portable device could be brought into close proximity to a non-portable device and the devices would exchange information using a radio transport mechanism according to the NFC specification. Thus RFID-based data transfer between NFC Forum compliant terminals can be foreseen as involving many different kinds of consumer electronics devices such as TVs, digiboxes, etc.

The nature of this kind of RFID communication is 'touch' based where an RFID target device is held for a relatively short time in the RFID reader device's interrogation field. The 'touch' paradigm is based on user experience analysis where a 'touch' action measured in time should be equal to or less than 0.5 seconds. Thus, NFC RFID is only suitable for exchanging small data items where a transfer can be completed in a reasonably short time interval (less than 0.5 seconds). For larger data items it is preferred to utilize alternative transport mechanisms available in the portable device (e.g. mobile telephone or terminal device) such as WLAN or Bluetooth technology. In many cases, RFID can be seen as a user input enhancement where instead of requesting user guidance to manually create a connection between devices, RFID communication is used to exchange communication details by just touching two devices. Creating such communication requires devices to be able to carry out a relatively fast capability negotiation, i.e., during the RFID 'touch.'

Rules for communication can be contemplated where the NFC Initiator device is always sending request message and the NFC Target device is responding to requests with response messages. However, optimally, the capability negotiation between two devices should happen in one message pair, i.e., requiring only a request from the Initiator and a response from the Target device.

To fulfill such minimal timing requirements for the initial RFID 'touch,' there must be rules for exchanging data between the devices with correspondingly minimal data processing requirements. Ideally the responding device should be able to compose a default response beforehand in order to introduce as little overhead as possible to the RFID communication. To be capable of creating such a static message exchange, rules need to be defined on how communication is to be established and how service parameters are selected and communicated.

For NFC RFID communication no such solution exists.

DISCLOSURE OF INVENTION

An object of the present invention is to provide protocol rules and formats to make RFID communication time significantly faster and effective.

According to a first aspect of the present invention, a method for execution by a target near field communication (NFC) device comprises receiving an NFC request message from an initiator NFC device, determining a secondary transport mechanism for exchanging information with said initiator NFC device, determining a role for said target NFC device, sending a response message to said initiator NFC device indicating said secondary transport mechanism, and participating with said initiator NFC device in a communication for said exchanging information using said secondary transport mechanism.

In further accord with the first aspect of the present invention, the method further comprises identifying said role for said target NFC device in said response message. The role could be determined according to an indication in the message from the initiator NFC device. On the other hand, the role may be determined according to a rule.

Further in accord with the first aspect of the present invention, the step of determining comprises the steps of comparing one or more candidate secondary transport mechanisms identified by said initiator NFC device in said request message received by said target NFC device, and determining that one or more of said candidate secondary transport mechanisms is supported in said target NFC device and wherein said step of sending comprises the step of sending said response message to said initiator NFC device indicating said one or more of said candidate secondary transport mechanism supported in said target NFC device. The role for said target NFC device may be indicated in said response message. Or, the role may be determined according to a rule.

According to a second aspect of the present invention, a target near field communication (NFC) device, comprises means for receiving a NFC request message from an initiator NFC device; means for determining a secondary transport mechanism for exchanging information with said initiator NFC device; means for determining a role for said target NFC device; means for sending a response message to said initiator NFC device indicating said secondary transport mechanism; and means for participating with said initiator NFC device in a communication for said exchanging information using said secondary transport mechanism. A computer program may be provided, stored on a computer readable medium, for executing the foregoing steps within said target NFC device. Likewise, an integrated circuit for executing the foregoing steps may be provided within a target NFC device In further accord with the second aspect of the present invention, the target NFC further comprises means for identifying said role for said target NFC device in said response message. The role may determined according to a rule. Or, the role is determined according to an indication in said request message from said initiator NFC device.

In still further accord with the second aspect of the present invention, the means for determining comprises: means for comparing one or more candidate secondary transport mechanisms identified by said initiator NFC device in said request message received by said target NFC device; and means for determining that one or more of said candidate secondary transport mechanisms in supported in said target NFC device and wherein said means for sending said response message to said initiator NFC device is for indicating said one or more of said candidate secondary transport mechanisms supported in said target NFC device. The target NFC device may further comprise means for identifying said role for said target NFC device in said response message. The role might be determined according to an indication in said request message from said initiator NFC device. On the other hand, the role may be determined according to a rule.

According to a third aspect of the present invention, a method for execution by an initiator near field communication (NFC) device comprises the steps of: sending an NFC request message to a target NFC device, identifying one or more candidate secondary transport mechanisms, receiving a response message from said target NFC device indicating which of said one or more candidate secondary transport mechanisms is supported in said target NFC device, choosing a secondary transport mechanism according to which is supported in said target NFC device, or according to a rule, or both, determining a role for said initiator NFC device, and participating with said target NFC device in a communication for exchanging information using said secondary transport mechanism.

In further accord with the third aspect of the present invention, the method may further comprise the step of identifying said role for said initiator NFC device in said request message or determining said role from said response message. The role may determined according to an indication in said response message from said target NFC device. Or, said role may be determined according to a rule. Or, said role is determined according to an indication in said response message from said target NFC device.

In still further accord with the third aspect of the present invention, the step of choosing a secondary transport mechanism comprises the steps of: comparing said candidate secondary transport mechanisms supported in said target NFC device with said one or more candidate secondary transport mechanism identified in the request message sent to the target NFC device, and determining one of said secondary transport mechanisms supported in said target NFC device for use in said step of participating with said target NFC device in a communication for exchanging information using said secondary transport mechanism.

Further in accord with the third aspect of the present invention, the method further comprises a step of identifying said role for said initiator NFC device in said request message or determining said role from said response message. Or, said role may be determined according to a rule. Or, said role may be determined according to an indication in said response message from said target NFC device.

According to a fourth aspect of the present invention, an initiator near field communication (NFC) device comprises means for sending an NFC request message to a target NFC device identifying one or more candidate secondary transport mechanisms; means for receiving a response message from said target NFC device indicating which of said one or more candidate secondary transport mechanisms is supported in said target NFC device; means for choosing a secondary transport mechanism according to which is supported in said target NFC device, or according to a rule, or both; means for determining a role for said initiator NFC device; and means for participating with said target NFC device in a communication for exchanging information using said secondary transport mechanism. A computer program stored on a computer readable medium may be provided for executing the foregoing steps within said target NFC device. Likewise, an integrated circuit may be provided for executing the foregoing steps in whole or in part within a target NFC device.

In further accord with the fourth aspect of the present invention, the initiator NFC device further comprises means for identifying a role for said initiator NFC device in said request message or for determining said role from said response message. Or, the role may be determined according to a rule. Or, the role may be determined according to an indication in said response message from said target NFC device.

In still further accord with the fourth aspect of the present invention, said means for choosing a secondary transport mechanism comprises: means for comparing said candidate secondary transport mechanisms supported in said target NFC device with said one or more candidate secondary transport mechanism identified in the request message sent to the target NFC device, and means for determining one of said secondary transport mechanisms supported in said target NFC device for use in said step of participating with said target NFC device in a communication for exchanging information using said secondary transport mechanism.

Further in accord with the fourth aspect of the present invention, the device further comprises means for identifying said role for said initiator NFC device in said request message or for determining said role from said response message. Or, said role may be determined according to a rule. Or, said role may be determined according to an indication in said response message from said target NFC device.

According to a fifth aspect of the present invention, a method for operating a device as (a) a near field communication (NFC) initiator device or as (b) an NFC target device, comprises the steps of: (a) operating said device as an NFC initiator device by: sending an NFC request message to a target NFC device identifying one or more candidate secondary transport mechanisms, receiving a response message from said target NFC device indicating which of said one or more candidate secondary transport mechanisms is supported in said target NFC device, choosing a secondary transport mechanism according to which is supported in said target NFC device, or according to a rule, or both, determining a role for said NFC initiator device, and participating with said target NFC device in a communication for exchanging information using said secondary transport mechanism, or (b) operating said device as an NFC target device by: receiving a response message from an initiator NFC device, determining a secondary transport mechanism for exchanging information with said initiator NFC device, sending a response message reply to said initiator NFC device indicating said secondary transfer mechanism, determining a role for said target NFC device, and participating with said initiator NFC device in a communication for said exchanging information using said secondary transport mechanism.

In further accord with the fifth aspect of the present invention, when operating said device either as an NFC initiator device or as an NFC target device, said method further comprises the steps of identifying said role for said initiator NFC device or for said NFC target device in (a) said request message or in (b) said response message. On the other hand, when operating said device as an NFC initiator device or as an NFC target device, said role may be determined according to a rule. Or, when operating said device as an NFC initiator device or as an NFC target device, said role may be determined according to an indication in a response message from said target NFC device or from said request message from said initiator NFC device, respectively.

In still further accord with the fifth aspect of the present invention, when operating said device as an NFC initiator device, said step of choosing a secondary transport mechanism comprises the steps of comparing said candidate secondary transport mechanisms supported in said target NFC device with said one or more candidate secondary transport mechanisms identified in the request message sent to the target NFC device, and determining one of said secondary transport mechanisms supported in said target NFC device for use in said step of participating with said target NFC device in establishing a communication for exchanging information using said secondary transport mechanism. When operating said device as an NFC target device, said step of determining comprises the steps of: comparing one or more candidate secondary transport mechanisms identified by said initiator NFC device in said request message received by said target NFC device, and determining that one or more of said candidate secondary transport mechanisms is supported in said target NFC device and wherein said step of sending comprises the step of sending said response message to said initiator NFC device indicating said one or more of said candidate secondary transport mechanisms supported in said target NFC device. When operating said device as an NFC target device, said step of determining comprises the steps of: comparing one or more candidate secondary transport mechanisms identified by said initiator NFC device in said request message received by said target NFC device, and determining that one or more of said candidate secondary transport mechanisms is supported in said target NFC device and wherein said step of sending comprises the step of sending said response message to said initiator NFC device indicating said one or more of said candidate secondary transport mechanisms supported in said target NFC device. When operating said device either as an NFC initiator device or as an NFC target device, said method further comprises the steps of indicating said role for said initiator NFC device or said NFC target device in (a) said request message or in (b) said response message. Or, said role may be determined according to a rule. Or, wherein when operating said device as an NFC initiator device or as an NFC target device, said role may determined according to an indication in said response message from said target NFC device or from said request message from said initiator NFC device, respectively.

Thus, according to the present invention, mapping an NFC level communication to a secondary bearer communication is provided in a way that enables roles to be established in a quick message exchange on the RFID level followed by automatic establishment of the secondary bearer communication without any user input needed.

By predefining a simple, static message structure, a faster RFID communication is achieved.

Although the present invention is particularly applicable to and useful for use in so-called Near Field Devices made in conformance with the above-mentioned published documents, it is not limited to any particular industry specification. In other words, it should be realized that the invention is useful in any situation where a device is equipped to communicate wirelessly using a wireless communication that is only useable over a very limited distance. The "very limited distance" referred to here means a distance that is even less than used in existing short range wireless communications such as Bluetooth communications and WLANs (called "secondary" communication technologies herein). For instance, present NFC is contemplated over a distance of a few centimeters. This is distinguished from the above-mentioned "secondary" communication technologies which are useful in communicating over longer distances. For example, Bluetooth devices can usually communicate over distances of 10 meters to 100 meters depending on power class, and might not be useful at all at distances closer than 10 cm where some receivers might saturate. Thus, the term "near field communication" as used herein should be understood as embracing short range communications over distances much less (by at least an order of magnitude) than those used for Bluetooth devices or WLAN devices and the term is not limited to any particular "NFC" industry standard.

Further in this connection, the terms "proximity" and "vicinity" are well-known in the art. Using the same operating frequency of 13.56 MHz, there are different targets resulting in different technical approaches. The main differences are in the modulation and interrogation field strength required by the tag (transponder). ISO14443 aims to high power and high speed applications with communication speeds 106 kBit/s upwards. The minimum interrogation field strength is 1.5 A/m enabling an operating distance of up to 10 cm. ISO 15693 aims at low power with lower communication speeds (26 Kbit/s) resulting in an operating distance of up to 1 m. It is in practice the underlying hardware/standard that defines the operating range with proximity being up to 10 cm, while vicinity may be up to 1 m).

These and other objects, features and advantages of the present invention will become more apparent in light of the following detailed description of a best mode embodiment thereof, as illustrated in the accompanying drawing.

DETAILED DESCRIPTION OF THE INVENTION

Figure 1:
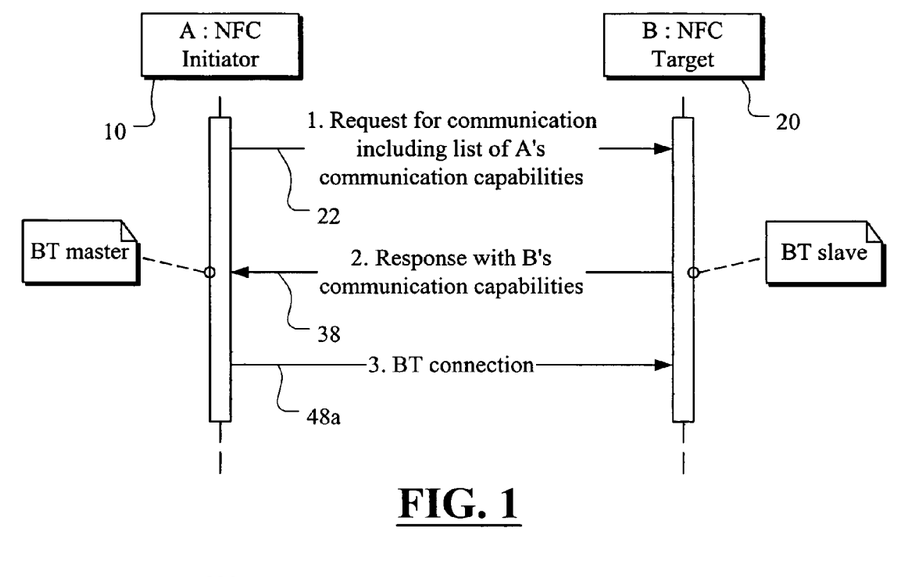
FIG. 1 shows a communication flow between A and B RFID components, according to the invention.

FIG. 1 shows a communication flow between devices A and B which are each equipped with Near Field Communication (NFC) capabilities. Suppose for example that the device A is a terminal device such as a portable electronic device in the form of a mobile telephone equipped with both Bluetooth technology and wireless local area network (WLAN) technology capabilities. The user wants to establish a communication with a nearby device B 20 which may for example be a laptop computer also equipped with both Bluetooth and WLAN technology capabilities. The user of device A may consult an application program which the user wishes to utilize in conjunction with the device B or the information contained in the device B or, wishes to communicate with the user of device B, or the like. The user navigates the application program with suitable inputs so as to cause an NFC initiation signal on a line 22 to be sent from device A 10 to device B 20 containing a request for communication including a list of device A's communication capabilities. In this scenario the device A is acting as an NFC initiator as specified in the near field communication interface and protocol specifications such as ECMA-340, ECMA-352 and ECMA-356.

Figure 2:
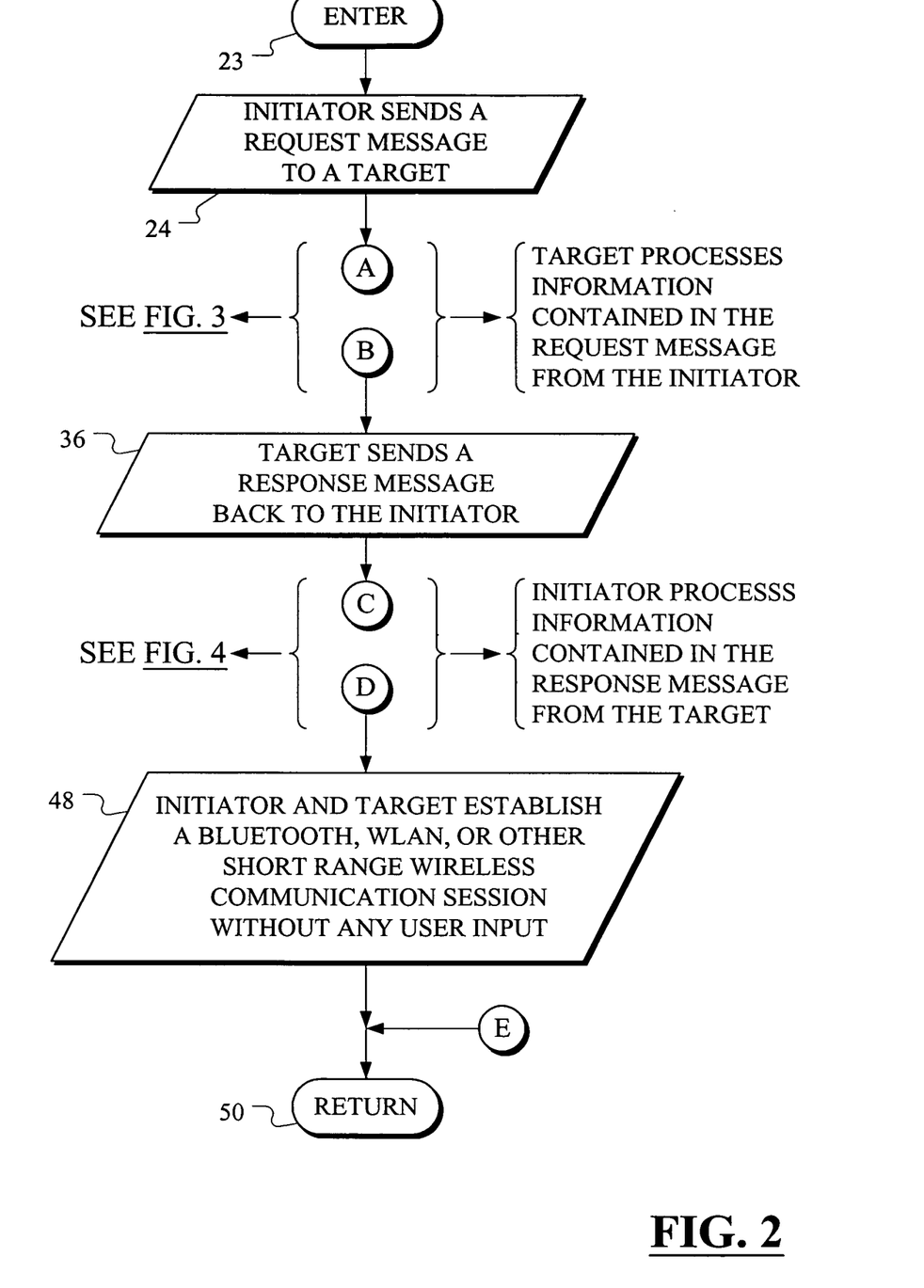
FIG. 2 shows an example of a system level description of an overall NFC message exchange, according to the invention, leading to establishment of a secondary bearer communication with roles already defined.
Figure 3:
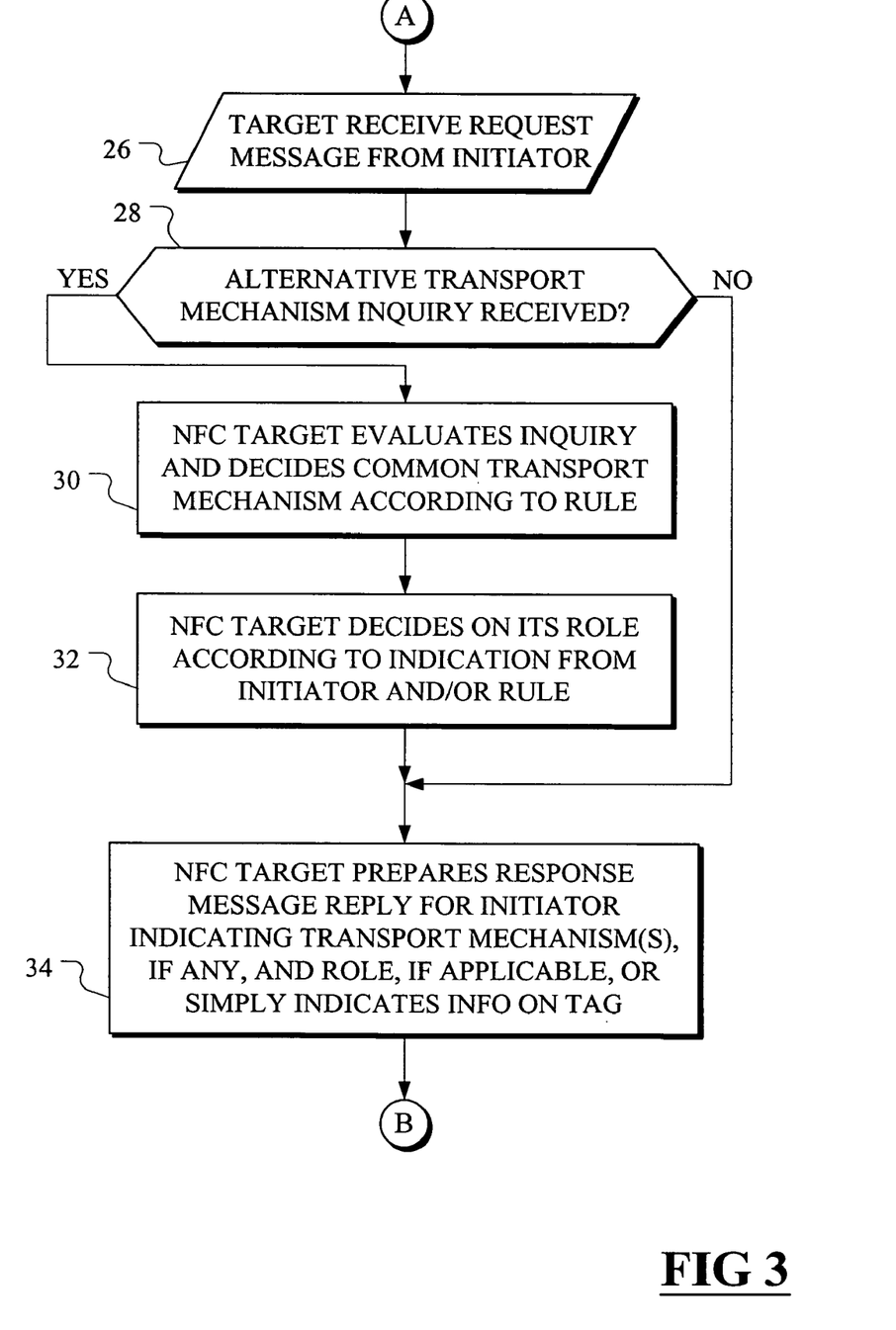
FIG. 3 shows an example of process steps carried out in a target, according to the invention.

Referring to FIG. 2, which is a system level description of what takes place in the devices of FIG. 1, after entering in a step 23, the initiator 10 of FIG. 1 sends a message as shown in a step 24 to the target 20 as previously indicated in FIG. 1 on the line 22. As shown in FIG. 3, the target device 20 is shown receiving the message on the line 22 from the initiator in a step 26. The target device 20 decides in a step 28 whether the signal from the initiator contains an alternative transport mechanism inquiry. If so, the NFC target device 20 evaluates the inquiry in a step 30 and may decide, based on the information contained in the inquiry, whether a common transport mechanism such as a Bluetooth mechanism or WLAN mechanism which is supported in the inquiring device A 10 is also supported in the target device 20. If so, the target device 20 may further decide in a step 32 which transport mechanism is to be used according to a predetermined rule. Such a predetermined rule is useful if it is desired to minimize the number of interchanges of messages between the initiator and the target. In addition to deciding the transport mechanism that is to be used, the NFC target device 20 may further decide in the step 32 what its role should be, either according to an indication from the initiator, or a rule, or both. For instance, it could decide to be a master or a slave in a Bluetooth scenario. After that, in a step 34, the NFC target device 20 prepares a reply message intended for the initiator device 10 indicating the transport mechanism or mechanisms available, if any, and the role selected by the target, if applicable. If the step 28 determined that no inquiry (requesting setup of a secondary communication technology) was present, it may for instance simply indicate information available on an RFID tag in the target device 20. In any case, a transition is then made back to the flow chart of FIG. 2 wherein a step 36 is then executed where the target device 20 sends the message back to the initiator as indicated by a signal on a line 38 in FIG. 1.

It should be realized that the flow chart of FIG. 3 is merely an example and other process steps can also be carried out in an NFC target device, according to the invention. The main idea is that the target device processes information contained in the message from the initiator device and prepares a reply that is consistent with the objects of the present invention in which rules and formats are followed to make the RFID communication time significantly faster and more effective.

Figure 4:
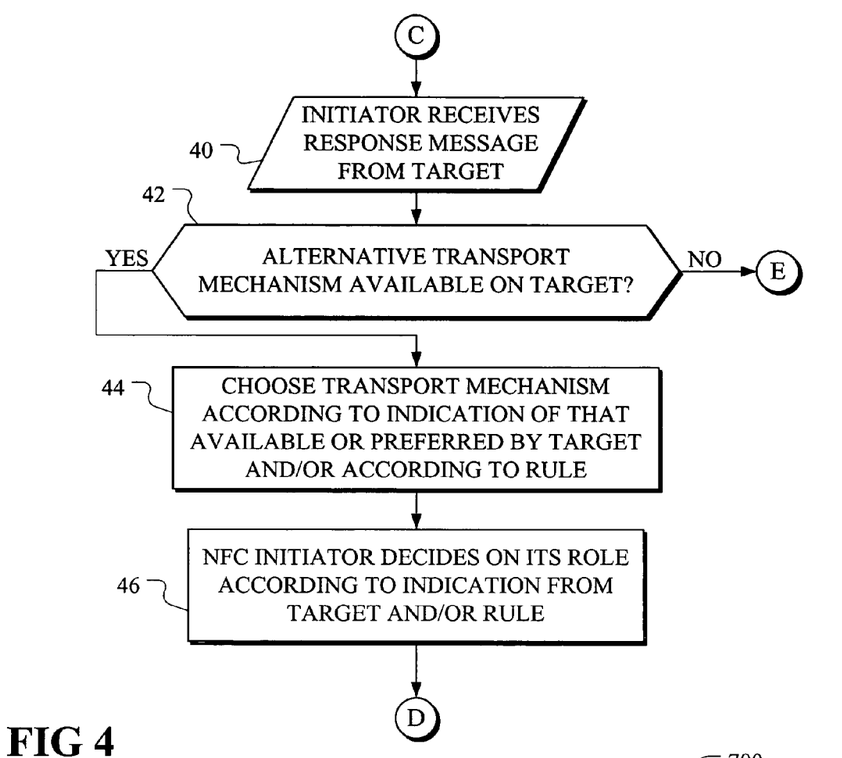
FIG. 4 shows an example of process steps carried out in an initiator, according to the invention.

Referring now to FIG. 4, the initiator device 10 receives the message on the line 38 from the target 20 as shown in a step 40. A determination is then made by the initiator device 10 as to whether an alternative transport mechanism is available on the target device 20, as shown in a step 42. If not, a return is made as indicated in a transition E from FIG. 4 back to a return step 50 of FIG. 2. But, if the target has indicated that an alternative transport mechanism is available, as decided by the step 42, a step 44 is next executed by the initiator 10 to choose the transport mechanism according to the indication of that available or preferred by the target and/or according to a predetermined rule. Once that is done, the NFC initiator device 10 decides on its role according to the indication from the target and/or the predetermined rule as indicated in a step 46. A return is then made to the steps of FIG. 2 wherein a step 48 is next executed. In step 48 the initiator and the target devices 10, 20 establish a Bluetooth, WLAN, or other short range wireless communication session with a bandwidth greater than that of NFC technology, without any need for further user input. A return is then made as indicated in the step 50. It should be understood that the roles of Terminal A and Terminal B are interchangeable depending on NFC level Initiator/Target role selection.

A few example scenarios are now described:

Terminal A has no data to give, Terminal B has data to give—Terminal A sends, in the step 24 of FIG. 2, a list of supported communication capability parameters (BT/WLAN/Other short range wireless connection) to terminal B (Target) in initial RFID request message. In the case Terminal B has some data to give, Terminal B (Target) uses predefined rules to select communication method and role for itself according to steps 30, 32 and 34 of FIG. 3 and responds to Terminal A in the step 36 of FIG. 2 with the selected communication method ID (BT/WLAN/Other short range wireless connection) and possibly also identifying its role if an explicit communication of the role is needed. If terminal B has no data to give handover to another bearer doesn't take place (naturally there is no utilization for such link). After communication capability and role messages are exchanged over NFC RFID between terminal A and terminal B, Terminal B initiates secondary bearer communication channel towards Terminal A based on information exchanged earlier between terminals as shown in step 48 of FIG. 2.

Terminal A has data to give, Terminal B has no data to give—Terminal A sends a list of supported communication capabilities parameters (BT/WLAN/Other short range wireless connection) to terminal B (Target) in initial NFC RFID request message as shown in step 24 of FIG. 2. Terminal B (Target) uses predefined rules to select a communication method and role in the steps 30, 32 and 34 and responds to Terminal A with the selected communication method ID (BT/WLAN/Other short range wireless connection) as shown by the step 36 of FIG. 2. After communication capability messages are exchanged over NFC RFID terminal A and terminal B, Terminal A initiates secondary bearer communication channel towards Terminal B based on information exchanged earlier between terminals as shown in the step 48 of FIG. 2.

Terminal A has data to give, Terminal B has data to give—NFC level Initiator and Target roles are mapped to secondary bearer roles as follows: NFC Initiator will typically be a Bluetooth master Even though this might be typical, what is important is that there is some rule of how Initiator-Target roles are mapped to e.g. BT master-slave roles; for instance, it could instead be something like the magnitude of the physical BT address being the deciding rule or some such similar rule. Similar considerations would apply for deciding a WLAN ad-hoc network host role versus a client role. Similarly, the role of the NFC Target device would typically be a Bluetooth client or a WLAN ad-hoc network client. Thus, in the step 32 of FIG. 3, the target device 20 will conclude it is a slave or client due to this rule and the rule information does not have to be communicated back to the target 10 because the target knows the rule too.

Again, it should be realized that the role of the Initiator is not necessarily always the master with Target always a slave, although that scenario is one possible result, according to the invention. If both Bluetooth and WLAN are available in both devices it's up to device configuration which one has the higher priority.

As mentioned briefly above, another exemplary rule for selecting the BT master-slave roles could be that the BT device addresses are compared and the device with greater address assumes the role of the master, whereas the device with lower BT device address assumes the role of the slave. The comparison may be performed, but is not restricted to, by alphanumerically comparing the BT device addresses of the devices, by converting the BT device addresses to integers, by using arithmetic operations, or like.

Message exchange between terminals A and B is considered to be a normal connection negotiation that is enabled by a predetermined protocol. Such a protocol could be modeled on the foregoing description with similar rules on how the secondary connection should be initialized. The above described rules enable exchanging supported communication capabilities from NFC Initiator to NFC Target and vice versa. The invention also defines rules on how NFC level communication roles (Initiator/Target) are mapped to Bluetooth/WLAN level network roles. Without such roles bi-directional data exchange would not be possible due to polling requirements for RFID hardware. Here polling refers to the functionality of using a time-based pattern to search different types of RFID devices and thus setting the terminal device itself to different modes during the polling sequence.

Another Example:

Terminal A wants to share data with Terminal B. Terminal A (NFC Initiator) prepares a list of its communication capabilities in the initial RFID request message (for example RFID communication, Bluetooth address and WLAN ad-hoc network name). When RFID communication is established (terminals are touched), request message is sent from Terminal A to Terminal B as shown in the step 24 of FIG. 2. Terminal B responds with response message as shown in step 36 of FIG. 2 including terminal B communication capabilities (for example Bluetooth address). After exchanging RFID messages terminals A and B make a decision to start a Bluetooth connection since only Bluetooth is supported at both ends. Terminal A takes the Bluetooth master role and terminal B takes the Bluetooth client role.

Due to the nature of RFID communication between two NFC devices in the mobile domain, Initiator and Target, the selection of Initiator and Target device is not static. If we have two terminals A and B, both can acts as NFC Initiator or Target and the capability to act as either should be built in to a mobile device. Successful NFC communication always requires that one entity is in the Initiator mode and one entity is in the Target mode.

For example, in the case of a Bluetooth connection, one of the devices needs to be host/master where clients can connect (e.g., when sending image from one terminal to another, the receiving terminal accepts connections therefrom). Now if a scenario is considered where both terminals want to give something, and taking randomness of NFC level Initiator/Target role, some kind of rule needs to be in place to organize the data transfer (e.g., NFC Initiator sends image first, NFC Target is Bluetooth master, etc.).

Whenever a terminal has RFID activated it is capable of providing its communication capabilities in NFC level messages despite the NFC level role it will take. NFC level role will define the polling sequence used to seek for different types of RFID devices by the terminal. If the NFC Initiator mode is selected, the terminal will send an initial request message containing a list of communication capabilities to the receiving entity as shown in the step 24 of FIG. 2. If the NFC Target mode is selected, the terminal will respond to the request message with a response message containing a list of communication capabilities as shown in the step 36 of FIG. 2.

As with the steps of FIG. 3, it should be realized that the steps shown in FIG. 4 represent only one embodiment of the present invention and different steps in a different order could also be carried out and achieve the same goal of having the initiator process the information contained in the response message from the target.

Figure 5:
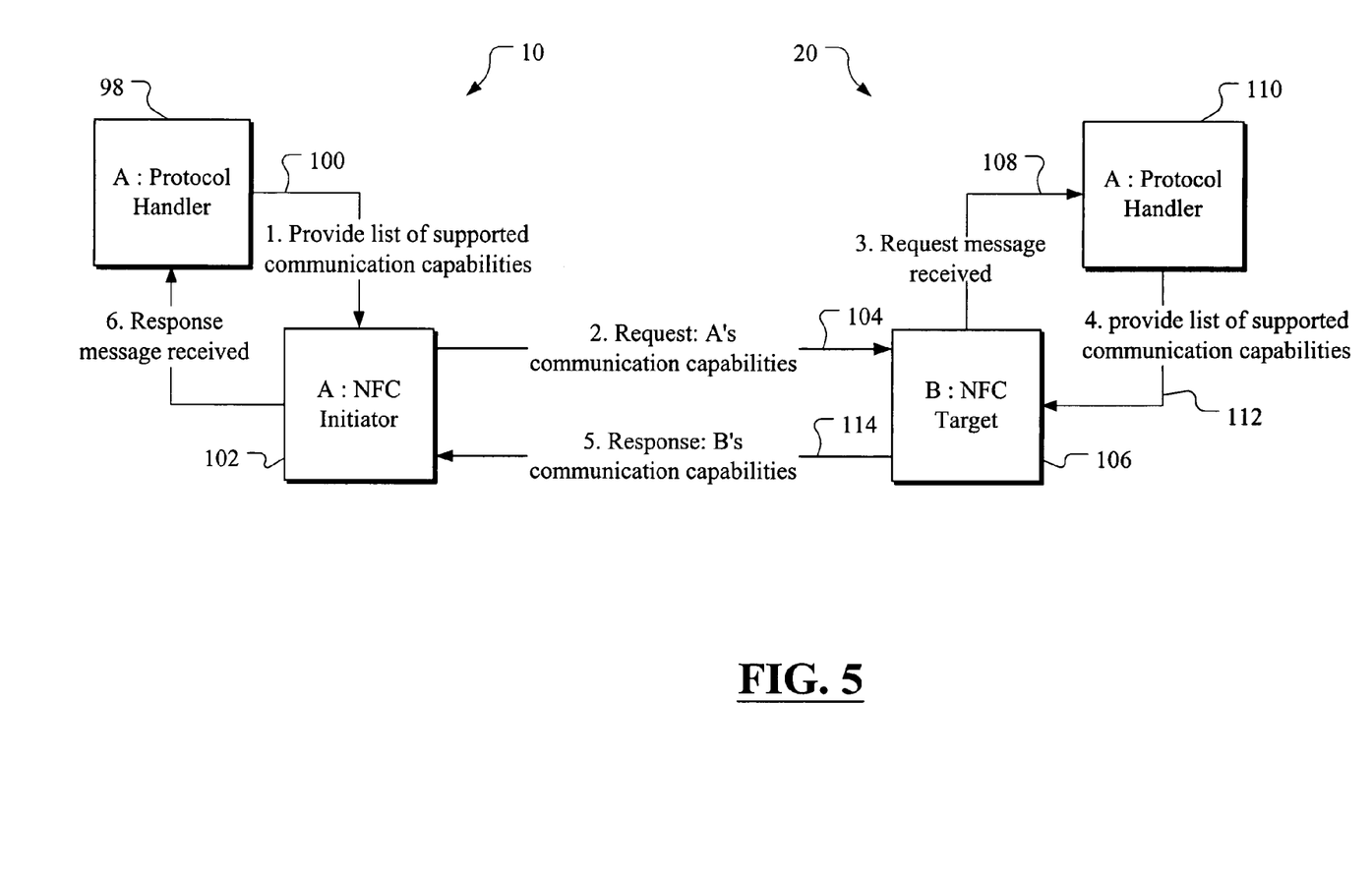
FIG. 5 presents an embodiment of the invention showing a communication flow between A and B sides including details relating to protocol handlers coupled to initiator/target, according to the invention.

As depicted in FIG. 5, an exemplary protocol handler 98 at an Initiator device (A) 10 provides a signal on a line 100 with a list of supported communication capabilities identifying different transport mechanisms and possibly corresponding roles. This can be viewed as a step preparatory to the step 24 shown in FIG. 2. An NFC RFID part 102 of the device A 10 sends a request message signal on a line 104 containing a list of device A's supported communication methods to an RFID part 106 of receiving (target) device (B) 20. The RFID part 106 processes the information received on the line 104 and provides processed information on a line 108 containing pertinent information concerning device A's capabilities and possibly its role(s) in a format understood by a handler 110. The handler 110 may be used to carry out the steps of FIG. 3 for instance. Protocol handler 110 at receiving end (B) then provides a list of communication capabilities of terminal device B on a line 112 back to the RFID part 106. The NFC RFID part 106 of the device B sends a signal response on a line 114 containing identified communication capabilities to the RFID part 102 of terminal device A 10 and the steps of FIG. 4 are executed in the device 10.

Depending on the supported communication capabilities of both A and B terminal devices, and the NFC Initiator terminal device configuration (transport method priorities e.g. WLAN over BT), the NFC Initiator device creates a connection to terminal device B as per step 48 of FIG. 2; in the Bluetooth case the NFC Initiator device will typically take the BT master role and connect to terminal device B which is typically set to the Bluetooth slave mode. In the WLAN case the NFC Initiator device will create a WLAN ad-hoc network and terminal device B will connect to it.

The advantage of exchanging communication parameters from the NFC Initiator device to the NFC Target device and vice versa is the ability to support different polling schemas for detecting different types of RFID devices (that leads to randomness of NFC Initiator/Target roles) and exchanging information where Only the NFC Initiator terminal is giving data to receiving entity Only the NFC Target terminal is giving data to receiving entity Both NFC Initiator and Target terminals are giving data The NFC message format defined by the NFC forum can be used to convey a Tag-Length-Value triplet, where:

Tag record identifies the content of the data,

Length is the length of the following data,

Value data is the concrete data defined by the Tag/Type, e.g. Bluetooth address.

For example, BT address could be represented as:

```
-----------------------------------------------------------------------
| record type = BTAddress (e.g. 0x11) | length = 10 bytes | BTAddress 0x012345679 |
-----------------------------------------------------------------------
```

So, another thing that is valuable here is that here is described what happens when two terminals want to give data simultaneously. For example, the decision of which terminal will be the Bluetooth (BT) master and which the BT slave is made according to this message description in order to establish the connection between the terminals.

Preferably, this should not be based on anything pre-determined since a) in NFC-level, the Initator/Target roles are determined "randomly" (because different devices are searched in random cycles b) BT master role may already be in use in the terminal (e.g BT headset connected to the phone), in which case the terminal would like to be in BT slave mode.

Figure 6:
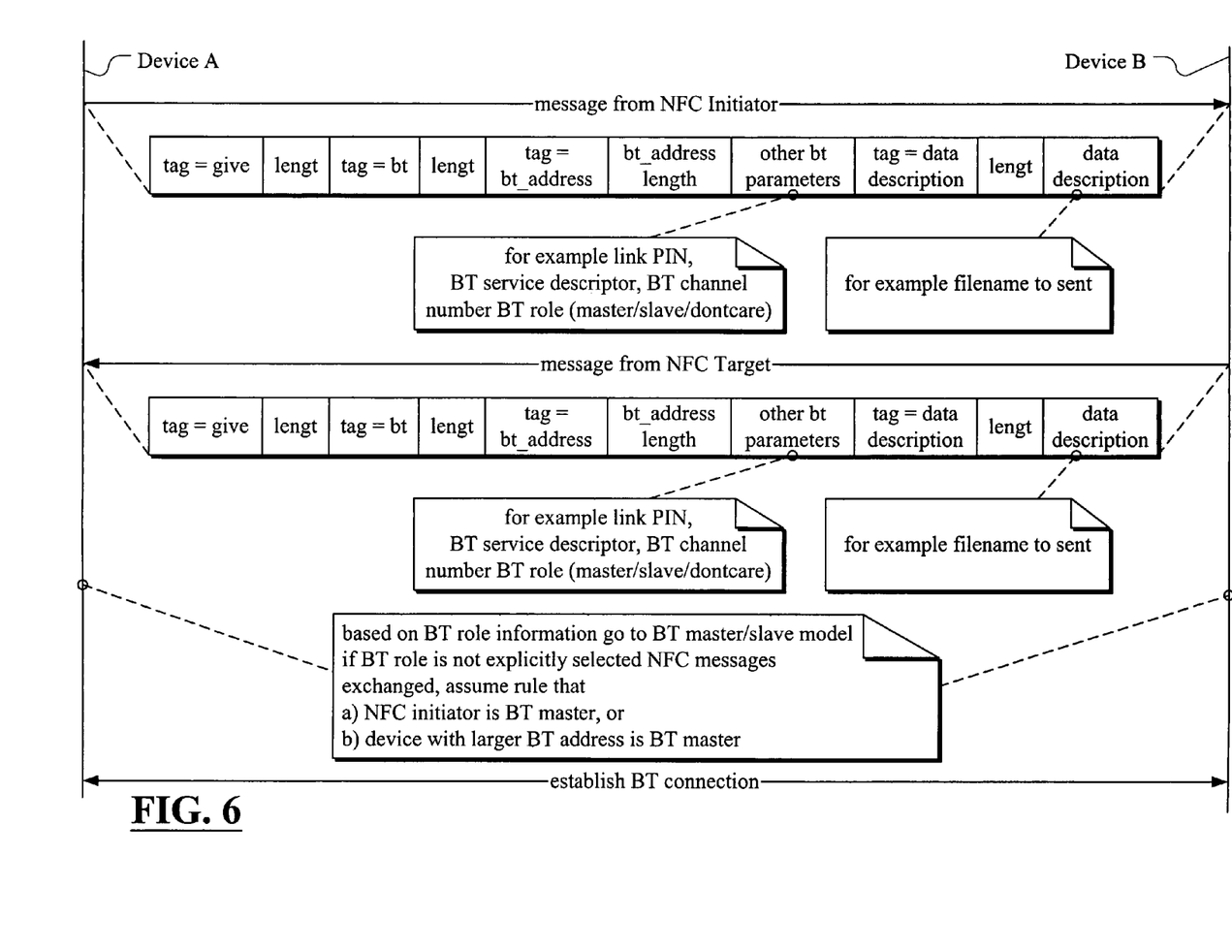
FIG. 6 shows an example of a message transfer, according to the invention.

FIG. 6 describes one example of a message pair. The label texts are abbreviated and are therefore not grammatically correct (e.g., lengt) but the meaning should be clear.

Figure 7:
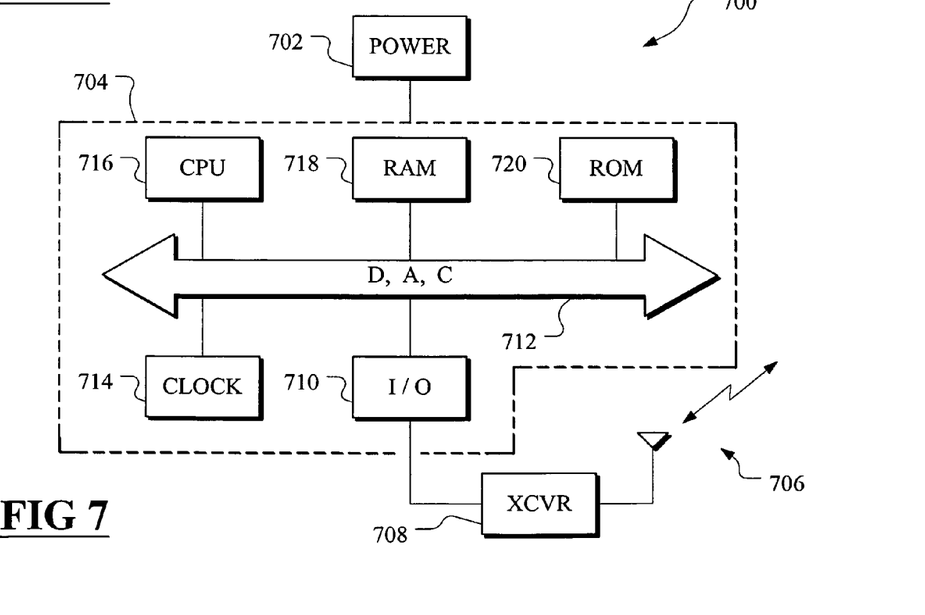
FIG. 7 shows an example of an NFC device according to the invention.
Figure 8:
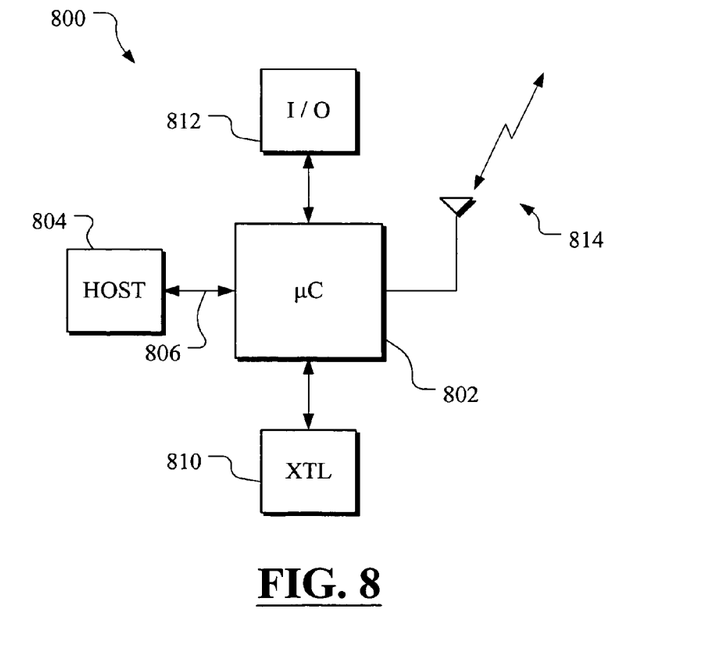
FIG. 8 shows another example of an NFC device according to the invention.

FIG. 7 shows a near field communication (NFC) device 700 which includes a power supply 702 and a signal processor 704 coupled to an antenna 706. The power supply 702 may include a battery and power management devices for supplying power to the signal processor 704 in an efficient way. Also shown in FIG. 7 is a transceiver 708 in between the signal processor 704 and the antenna 706 for sending and receiving radio signals via the antenna 706. The transceiver 708 is connected to an input/output device 710 which is in turn connected to a data, address and control bus 712 which interconnects to the various components of the signal processor 704 which also includes a clock 714, a central processing unit 716, a random access memory 718, and a read only memory 720. Various other components may also be included in the signal processor 704 but are not shown for purposes of simplicity. According to the methodologies disclosed above in connection with the present invention, for example in FIG. 1-6, the steps for instance in FIG. 2 and in FIG. 3 can be encoded in a programming language and stored in the read only memory 720 for execution by the central processing unit 716 when called upon by the circumstances warranting the use of the device 700 as a target receiver in a near field communication scenario. On the other hand, there can also be a stored program encoded to reflect the methods steps shown in FIG. 2 and in FIG. 4 where the device 700 may be used in appropriate circumstances as a near field communication initiator device. Thus, the device 700 can act as either the device 10 or the device 20 of FIG. 1. It will be appreciated by those of skill in the art that instead of a general purpose signal processor 704, a special purpose piece or pieces (chipset) of integrated circuit hardware could be used instead with a series of gates and other electronic components setup in silicon to carry out the same functions as shown in FIGS. 1-6. Similarly, as shown in FIG. 8, a device 800 comprises a microcontroller 802 that could be provided to perform some or all of the functions shown in FIGS. 1-6 while others of those functions can be carried out in a host 804 in communication on a line 806 with the microcontroller. Thus, it will be understood that the functions disclosed herein can be carried out in hardware, software, or a combination of hardware and software. The device of FIG. 8 also includes a crystal 810 and an input/output device 812. The microcontroller itself is shown coupled to an antenna 814 which is able to carry out both the near field communications and the secondary wireless communication of the present invention over the appropriate radio interfaces, both near field and short range.

Figure 9:
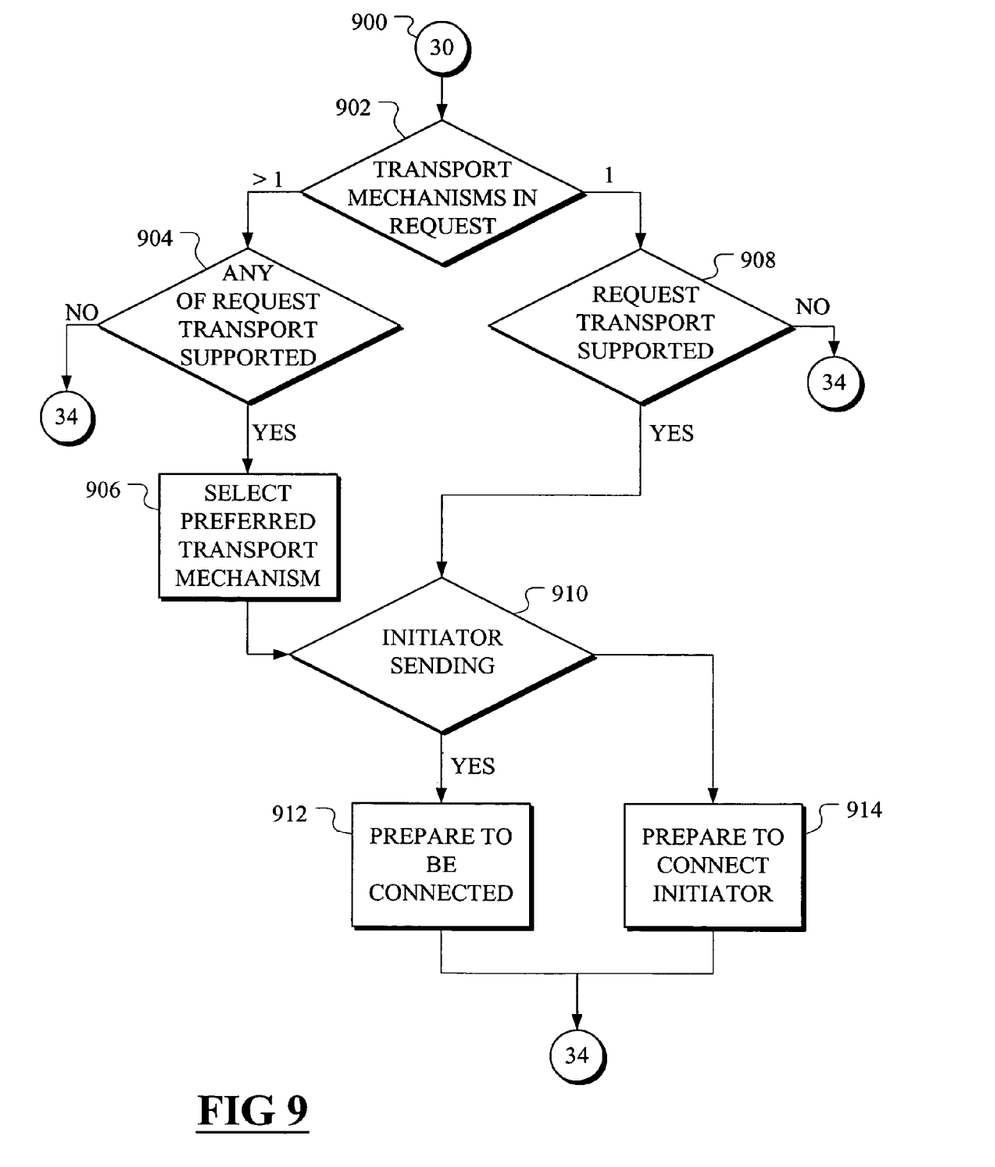
FIG. 9 is an example of process steps which may be carried out in a device, according to the invention.

FIG. 9 is a flowchart showing yet another embodiment of the invention. After entering in a step 900, a decision is made in a step 902 whether one or more transport mechanisms are in a request message. If more than one is indicated, a decision is made in a step 904 regarding whether or not any of the indicated transport mechanisms are supported. If not, a return 34 is made. If so, a preferred transport mechanism is selected in a step 906. If the step 902 determined only one transport mechanism was indicated in the request message, a step 908 would be carried out instead of step 904. In step 908 a decision is made as to whether the single indicated mechanism is supported or not. If not, a return 34 is made but, if so, a step 910 is executed as is also the case after executing the step 906. In step 910, a decision is made as to whether an initiator is sending. If so, a step 912 is executed in order to prepare to be connected. This is followed by a return 34. If the initiator is not sending, preparations are made in a step 914 to connect to the initiator followed by a return 34.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Method for execution by a target near field communication device, comprising:

receiving a request message from an initiator near field communication device, determining a secondary transport mechanism for exchanging information with said initiator near field communication device, determining a role for said target near field communication device, sending a response message to said initiator near field communication device indicating said secondary transport mechanism, and establishing a connection to said initiator near field communication device for said exchanging information using said secondary transport mechanism.

2. The method of claim 1, further comprising:

identifying said role for said target near field communication device in said response message.

3. The method of claim 1, wherein said role is determined according to a rule.

4. The method of claim 1, wherein said role is determined according to an indication in said message from said initiator near field communication device.

5. The method of claim 1, wherein said determining comprises:

comparing one or more candidate secondary transport mechanisms identified by said initiator near field communication device in said request message received by said target near field communication device, and determining that one or more of said candidate secondary transport mechanisms is supported in said target near field communication device and wherein said sending comprises sending said response message to said initiator near field communication device indicating said one or more of said candidate secondary transport mechanism supported in said target near field communication device.

6. The method of claim 5, further comprising:
identifying said role for said target near field communication device in said response message.

7. The method of claim 6, wherein said role is determined according to a rule.

8. The method of claim 6, wherein said role is determined according to an indicator in said request message from said initiator near field communication device.

9. Computer program stored on a computer readable medium for executing the method of claim 1 within said target near field communication device.

10. Integrated circuit for executing the method of claim 1 within a target near field communication device.

11. Target near field communication device, comprising a processor configured to receive a request message from an initiator near field communication device;
to determine a secondary transport mechanism for exchanging information with said initiator near field communication device;
to determine a role for said target near field communication device;
to send a response message to said initiator near field communication device indicating said secondary transport mechanism; and
to establish a connection to said initiator near field communication device for said exchanging information using said secondary transport mechanism.

12. The target near field communication device of claim 11, said processor further configured to identify said role for said target near field communication device in said response message.

13. The target near field communication device of claim 11, wherein said role is determined according to a rule.

14. The target near field communication device of claim 11, wherein said role is determined according to an indication in said request message from said initiator near field communication device.

15. The target near field communication device of claim 11, wherein said processor configured to determine said secondary transport mechanism is configured:
to compare one or more candidate secondary transport mechanisms identified by said initiator near field communication device in said request message received by said target near field communication device; and
to determine that one or more of said candidate secondary transport mechanisms in supported in said target near field communication device and wherein said processor configured to send said response message to said initiator near field communication device is configured to indicate said one or more of said candidate secondary transport mechanisms supported in said target near field communication device.

16. The target near field communication device of claim 15, said processor further configured to identify said role for said target near field communication device in said response message.

17. The target near field communication device of claim 16, wherein said role is determined according to a rule.

18. The target near field communication device of claim 16, wherein said role is determined according to an indication in said request message from said initiator near field communication device.

19. Method for execution by an initiator near field communication near field communication device, comprising:
sending a request message to a target near field communication device identifying one or more candidate secondary transport mechanisms,
receiving a response message from said target near field communication device indicating which of said one or more candidate secondary transport mechanisms is supported in said target near field communication device,
choosing a secondary transport mechanism according to which is supported in said target near field communication device, or according to a rule, or both,
determining a role for said initiator near field communication device, and
establishing a connection to said target near field communication device for exchanging information using said secondary transport mechanism.

20. The method of claim 19, further comprising identifying said role for said initiator near field communication device in said request message or determining said role from said response message.

21. The method of claim 19, wherein said role is determined according to a rule.

22. The method of claim 19, wherein said role is determined according to an indication in said response message from said target near field communication device.

23. The method of claim 19, wherein said choosing a secondary transport mechanism comprises:
comparing said candidate secondary transport mechanisms supported in said target near field communication device with said one or more candidate secondary transport mechanism identified in the request message sent to the target near field communication device, and
determining one of said secondary transport mechanisms supported in said target near field communication device for use in said establishing a connection to said target near field communication device in for said exchanging information using said secondary transport mechanism.

24. The method of claim 23, further comprising identifying said role for said initiator near field communication device in said request message or determining said role from said response message.

25. The method of claim 24, wherein said role is determined according to a rule.

26. The method of claim 24, wherein said role is determined according to an indication in said response message from said target near field communication device.

27. Computer program stored on a computer readable medium for executing the method of claim 19 within said initiator near field communication device.

28. Integrated circuit for executing the method of claim 19 within said initiator near field communication device.

29. Initiator near field communication near field communication device, comprising a processor configured
to send a request message to a target near field communication device identifying one or more candidate secondary transport mechanisms;
to receive a response message from said target near field communication device indicating which of said one or more candidate secondary transport mechanisms is supported in said target near field communication device;

to choose a secondary transport mechanism according to which is supported in said target near field communication device, or according to a rule, or both;

to determine a role for said initiator near field communication device; and to establish a connection to said target near field communication device for exchanging information using said secondary transport mechanism.

30. The initiator near field communication device of claim 29, said processor further configured to identify a role for said initiator near field communication device in said request message or for determining said role from said response message.

31. The initiator near field communication device of claim 29, wherein said role is determined according to a rule.

32. The initiator near field communication device of claim 29, wherein said role is determined according to an indication in said response message from said target near field communication device.

33. The initiator near field communication device of claim 29, wherein said processor configured to choose a secondary transport mechanism is configured to compare said candidate secondary transport mechanisms supported in said target near field communication device with said one or more candidate secondary transport mechanism identified in the request message sent to the target near field communication device, and to determine one of said secondary transport mechanisms supported in said target near field communication device for use in said establishing a connection to said target near field communication device for exchanging information using said secondary transport mechanism.

34. The initiator near field communication device of claim 33, said processor configured to identify said role for said initiator near field communication device in said request message or to determine said role from said response message.

35. The initiator near field communication device of claim 34, wherein said role is determined according to a rule.

36. The initiator near field communication device of claim 34, wherein said role is determined according to an indication in said response message from said target near field communication device.

37. Method for operating a device as (a) a near field communication initiator device or as (b) a near field communication target device, comprising:

(a) operating said device as said near field communication initiator device by:

(i) sending a request message to a target near field communication request message to a target near field communication device identifying one or more candidate secondary transport mechanisms, (ii) receiving a response message from said target near field communication device indicating which of said one or more candidate secondary transport mechanisms is supported in said target near field communication device, (iii) choosing a secondary transport mechanism according to which is supported in said target near field communication device, or according to a rule, or both, (iv) determining a role for said near field communication initiator device, and (v) establishing a connection to said target near field communication device for exchanging information using said secondary transport mechanism, or (b) operating said device as said near field communication target device by:

(i) receiving a response message from an initiator near field communication device;

(ii) determining a secondary transport mechanism for exchanging information with said initiator near field communication device;

(iii) sending a response message reply to said initiator near field communication device indicating said secondary transfer mechanism;

(iv) determining a role for said near field communication target device, and (v) establishing a connection to said initiator near field communication device for said exchanging information using said secondary transport mechanism.

38. The method of claim 37, wherein when operating said device either as said near field communication initiator device or as said near field communication target device, said method further comprises identifying said role for said near field communication initiator device or for said near field communication target device in (a) said request message or in (b) said response message.

39. The method of claim 38, wherein when operating said device as said near field communication initiator device or as said near field target device, said role is determined according to an indication in said response message from said target near field communication device or from said request message from said initiator near field communication device, respectively.

40. The method of claim 37, wherein when operating said device as said near field communication initiator device or as said near field communication target device, said role is determined according to a rule.

41. The method of claim 37, wherein when operating said device as said near field communication initiator device said choosing a secondary transport mechanism comprises comparing said candidate secondary transport mechanisms supported in said target near field communication device with said one or more candidate secondary transport mechanisms identified in the request message sent to the target near field communication device, and determining one of said secondary transport mechanisms supported in said target near field communication device for use in said establishing a communication to said target near field communication device for said exchanging information using said secondary transport mechanism.

42. The method of claim 41, wherein when operating said device as said near field communication target device, said determining comprises:

comparing one or more candidate secondary transport mechanisms identified by said initiator near field communication device in said request message received by said near field communication target device, and determining that one or more of said candidate secondary transport mechanisms is supported in said near field communication target device and wherein said sending comprises sending said response message to said initiator near field communication device indicating said one or more of said candidate secondary transport mechanisms supported in said near field communication target device.

43. The method of claim 42, wherein when operating said device either as said near field communication initiator device or as said near field communication target device, said method further comprises indicating said role for said near field communication initiator device or said near field communication target device in (a) said request message or in (b) said response message.

44. The method of claim 43, wherein said role is determined according to a rule.

45. The method of claim 43, wherein when operating said device as a near field communication initiator device or as a near field communication target device, said role is determined according to an indication in said response message from said target near field communication device or from said request message from said initiator near field communication device, respectively.

46. The method of claim 37, wherein when operating said device as said near field communication target device, said determining comprises:

comparing one or more candidate secondary transport mechanisms identified by said initiator near field communication device in said request message received by said near field communication target device, and determining that one or more of said candidate secondary transport mechanisms is supported in said near field communication target device and wherein said sending comprises sending said response message to said initiator near field communication device indicating said one or more of said candidate secondary transport mechanisms supported in said near field communication target device.

47. Apparatus comprising a processor for operating said apparatus as (a) a near field communication device or as (b) a near field communication target device, said processor configured to (a) operate said device as said near field communication initiator device by: (i) sending a request message to a target near field communication device identifying one or more candidate secondary transport mechanisms, (ii) receiving a response message from said target near field communication device indicating which of said one or more candidate secondary transport mechanisms is supported in said target near field communication device, (iii) choosing a secondary transport mechanism according to which is supported in said target near field communication device, or according to a rule, or both, (iv) determining a role for said near field communication initiator device, and (v) establishing a connection to said target near field communication device for exchanging information using said secondary transport mechanism, or (b) operate said device as said near field communication target device by: (i) receiving a response message from an initiator near field communication device; (ii) determining a secondary transport mechanism for exchanging information with said initiator near field communication device; (iii) sending a response message reply to said initiator near field communication device indicating said secondary transfer mechanism; (iv) determining a role for said near field communication target device, and (v) establishing a connection to said initiator near field communication device for said exchanging information using said secondary transport mechanism.

48. The apparatus of claim 47, wherein when operating said device either as said near field communication initiator device or as said near field communication target device, said processor is further configured to identify said role for said near field communication initiator device or for said near field communication target device in (a) said request message or in (b) said response message.

49. The apparatus of claim 48, wherein when said device is operated as said near field communication initiator device or as said near field target device, said role is determined according to an indication in said response message from said target near field communication device or from said request message from said initiator near field communication device, respectively.

50. The apparatus of claim 47, wherein when said device is operated as said near field communication initiator device or as said near field communication target device, said role is determined according to a rule.

51. The apparatus of claim 47, wherein when said device is operated as said near field communication initiator device said choosing a secondary transport mechanism comprises comparing said candidate secondary transport mechanisms supported in said target near field communication device with said one or more candidate secondary transport mechanisms identified in the request message sent to the target near field communication device, and determining one of said secondary transport mechanisms supported in said target near field communication device for use in said establishing said communication to said target near field communication device for said exchanging information using said secondary transport mechanism.

52. The apparatus of claim 51, wherein when said device is operated as said near field communication target device, said determining a secondary transport mechanism comprises:

comparing one or more candidate secondary transport mechanisms identified by said initiator near field communication device in said request message received by said near field communication target device, and determining that one or more of said candidate secondary transport mechanisms is supported in said near field communication target device and wherein said sending comprises sending said response message to said initiator near field communication device indicating said one or more of said candidate secondary transport mechanisms supported in said near field communication target device.

53. The apparatus of claim 52, wherein when said device is operated either as a near field communication initiator device or as a near field communication target device, said method further comprises indicating said role for said near field communication initiator device or said near field communication target device in (a) said request message or in (b) said response message.

54. The apparatus of claim 53, wherein said role is determined according to a rule.

55. The apparatus of claim 53, wherein when said device is operated as a near field communication initiator device or as a near field communication target device, said role is determined according to an indication in said response message from said target near field communication device or from said request message from said initiator near field communication device, respectively.

56. The apparatus of claim 47, wherein when said device is operated as a near field communication target device, said determining a secondary transport mechanism comprises:

comparing one or more candidate secondary transport mechanisms identified by said initiator near field communication device in said request message received by said near field communication target device, and determining that one or more of said candidate secondary transport mechanisms is supported in said near field communication target device and wherein said sending comprises sending said response message to said initiator near field communication device indicating said one or more of said candidate secondary transport mechanisms supported in said near field communication target device.

* * * * *

UNITED STATES PATENT AND TRADEMARK OFFICE
CERTIFICATE OF CORRECTION

PATENT NO. : 7,471,200 B2
APPLICATION NO. : 11/174289
DATED : December 30, 2008
INVENTOR(S) : Jari Otranen Page 1 of 1

It is certified that error appears in the above-identified patent and that said Letters Patent is hereby corrected as shown below:

In column 14, line 6, Claim 19 delete "near field communication.".

In column 14, lines 59-60, Claim 29 delete "near field communication" (second instance).

In column 15, line 24, Claim 29 "mechanism" should be --mechanisms--.

In column 15, lines 47-48, Claim 37 "request message to a target near field communication" should be deleted.

In column 17, line 63, Claim 49 after "field" insert --communication--.

Signed and Sealed this

Fourteenth Day of April, 2009

JOHN DOLL
*Acting Director of the United States Patent and Trademark Office*